United States Patent [19]

Stoneham

[11] 3,997,775
[45] Dec. 14, 1976

[54] ELECTRONIC FLASH UNIT HAVING AN ADJUSTABLE MOUNTING MECHANISM AND MOVABLE ELECTRICAL PLUG

[75] Inventor: Jeffrey Richard Stoneham, Hilton, N.Y.

[73] Assignee: Eastman Kodak Company, Rochester, N.Y.

[22] Filed: Apr. 8, 1975

[21] Appl. No.: 566,633

[52] U.S. Cl. .............................. 240/1.3; 354/145; 354/293
[51] Int. Cl.$^2$ ........................................ G03B 15/02
[58] Field of Search ............ 354/126, 81, 82, 129, 354/145, 139, 293; 339/59 L, 61 L, 154 L, 176 L; 240/1.3, 2 C

[56] References Cited

UNITED STATES PATENTS

| 2,614,471 | 10/1952 | Markowitz | 354/293 |
|---|---|---|---|
| 2,949,838 | 8/1960 | Skalabrin | 354/293 |
| 3,177,353 | 4/1965 | Schmidt | 240/2 C X |
| 3,753,390 | 8/1973 | Hough et al. | 240/1.3 X |
| 3,805,282 | 4/1974 | Erlichman | 240/1.3 X |
| 3,852,790 | 12/1974 | Robinson | 354/126 X |
| 3,883,884 | 5/1975 | Fuchsll | 354/126 |

FOREIGN PATENTS OR APPLICATIONS

| 1,229,845 | 12/1966 | Germany | 240/1.3 |

*Primary Examiner*—Edna M. O'Connor
*Attorney, Agent, or Firm*—D. P. Monteith

[57] ABSTRACT

An electronic flash unit includes a housing having an elongate passage. An electrical plug having a pair of contacts electrically connected to the flashtube-firing circuitry is movably mounted in the passage to locate the contacts at varying positions relative to the housing. The flash unit further includes a camera mounting bracket that is adjustable relative to the base of the housing. A ratchet mechanism prevents a control button operatively associated with the bracket and an electrical control switch from closing the switch to energize the flashtube-firing circuitry when the bracket engages the housing base.

5 Claims, 9 Drawing Figures

U.S. Patent  Dec. 14, 1976  Sheet 1 of 2  3,997,775
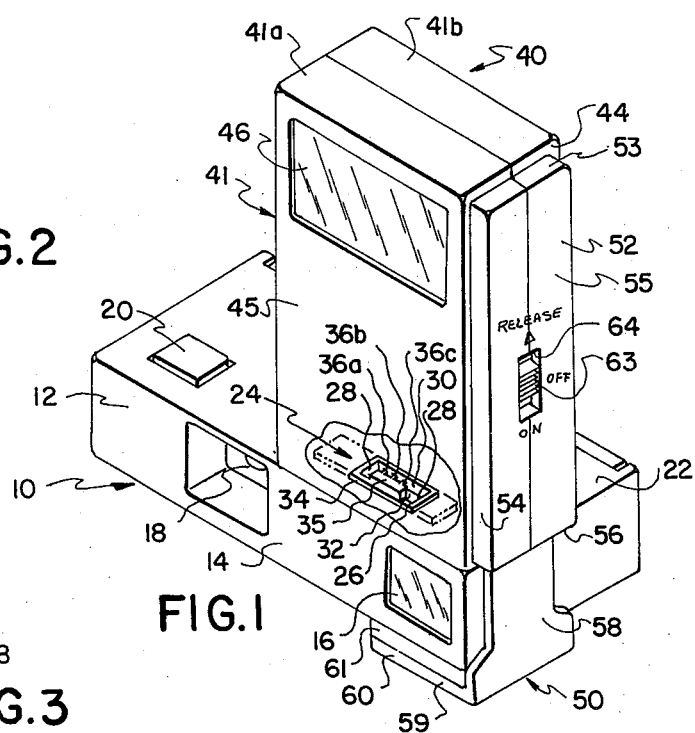
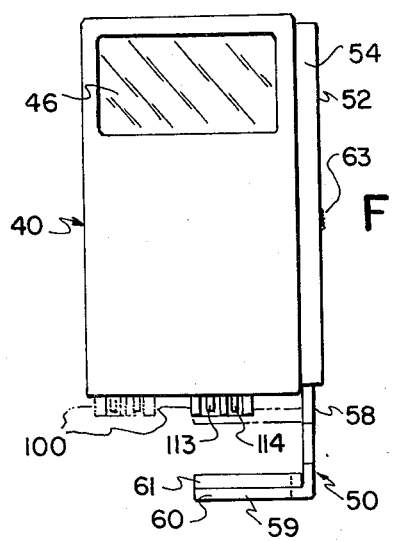
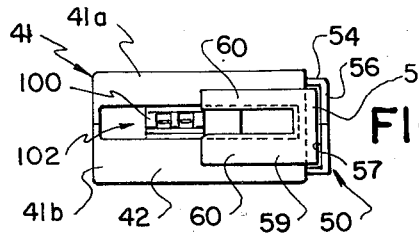
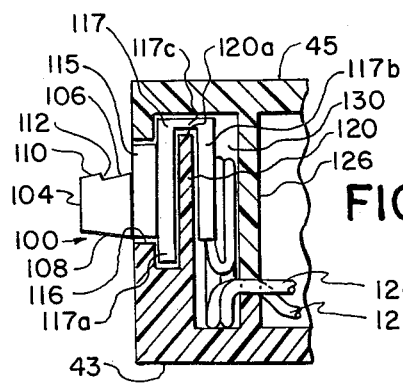
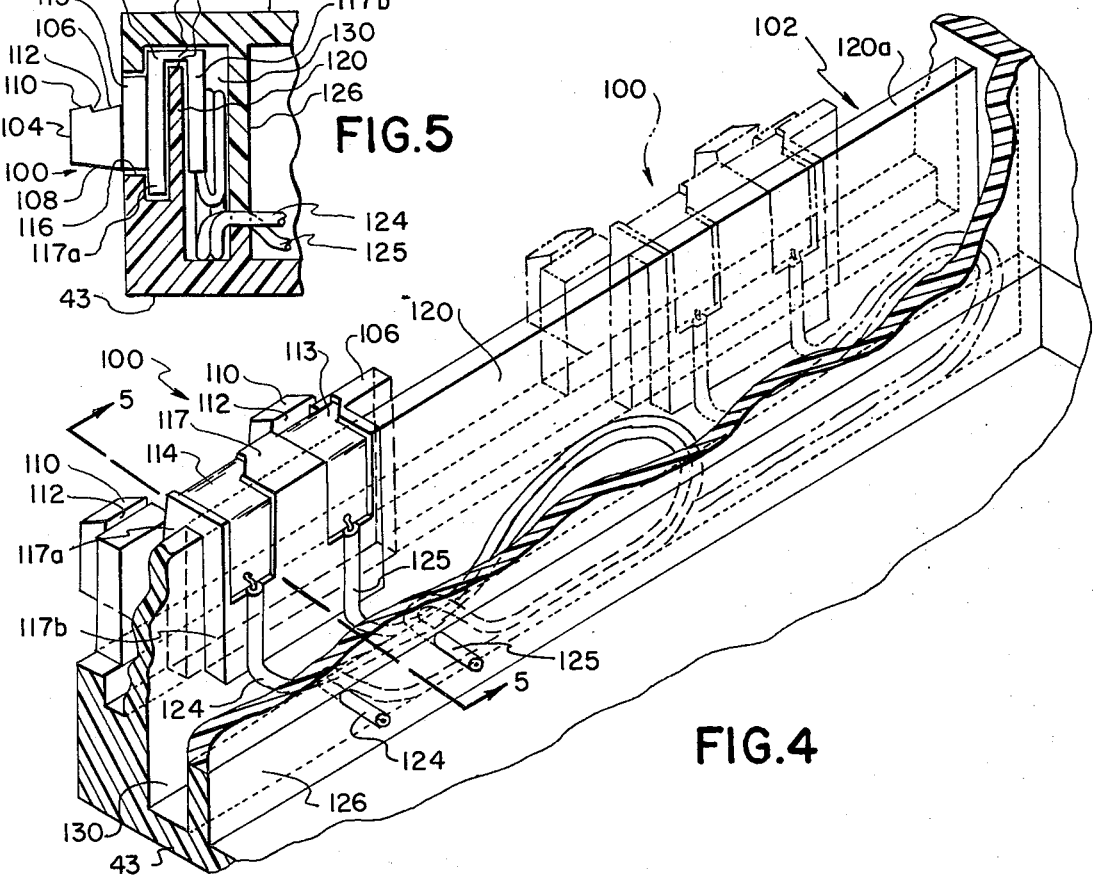

ELECTRONIC FLASH UNIT HAVING AN ADJUSTABLE MOUNTING MECHANISM AND MOVABLE ELECTRICAL PLUG

CROSS-REFERENCE APPLICATION

Reference is made to commonly assigned, copending U.S. patent application Ser. No. 528,529, now U.S. Pat. No. 3,941,447 entitled CAMERA FLASH SOCKET filed Nov. 29,1974 in the name of Hargrave et al.

BACKGROUND OF THE INVENTION

1. Field of the Invention

This invention relates to an electronic flash unit and, more particularly, to an electronic flash unit having an adjustable mounting mechanism and electrical plug movable to permit operational coupling of the flash unit to photographic cameras of varying size and electrical design, respectively.

2. Description of the Prior Art

Photographic camera manufacturers, like manufacturers in many other industries, often produce a variety of models of a particular product. For example, many camera manufacturers produce a number of different models of the well known pocket camera. These models may range from a very simple, low-cost design to a camera designed to operate over a wide range of picture-taking conditions. The former may include only a single lens and a fixed-speed shutter whereas the latter may employ an optical system having a number of optical components to achieve a high resolution image of the scene being photographed as well as exposure control apparatus controlled electronically to automatically set both the camera diaphragm and shutter speed in accordance with scene conditions. Of course, there may be other intermediate camera models which include features between that offered with the low-cost design and that possible with the camera having the highest quality and the greatest number of photographic features. With a wide range of camera models, the consumer is more able to select a camera according to his specific needs and desires.

As can readily be understood, because of the various designs incorporated into each of the different camera models, it may be necessary to have minor physical differences from one model to another of a particular line of cameras. For example, it may be necessary that one camera model be slightly larger than the other models or it may be that the camera flash-receiving receptacle is not located in exactly the same position on the camera body with respect to the other models. This results despite the fact all models may utilize the same size film, and have essentially the same flash-firing mechanism, etc.

As a result of these differences, camera accessory equipment, such as an electronic flash unit, manufacturing for a particular line of cameras may not be suitable for all camera models. There have been various attempts in the past to manufacture camera accessory equipment which can be utilized with cameras of different physical size and electrical design. For example, adjustable brackets for detachably connecting various photographic accessory equipment to cameras of varying size are known in the photographic art. U.S. Pat. No. 2,614,471 issued to J. Markowitz on Oct. 21, 1952, discloses a flash lamp supporting bracket which is adjustable to accommodate cameras of various sizes.

U.S. Pat. No. 2,949,838 issued to V. Skalabrin on Aug. 23, 1960, discloses an adjustable grip for compact cameras, the grip being connected to a flash accessory clip on top of the camera and to a tripod socket on the bottom thereof. The grip is adjustable to accommodate cameras of different size and cameras wherein the position of the flash accessory clip may vary.

U.S. Pat. No,. 3,852,790 issued to J. A. Robinson on Dec. 3, 1974 discloses a mechanism generally intended to mount an electronic flash unit on cameras of different size as well as cameras in which the flash attachment mechanism may be at different locations on the camera body. A mechanism of the kind disclosed in the Robinson patent is intended to mount a flash unit on a camera of the type having a flash unit attachment associated with rotating flash units. To achieve this result, a slidable and rotatably mounted post is included that has a cross-section adapted to fit into a rotatable flash cube socket built in a camera. Since the camera socket rotates after each exposure to present a different side of the flash cube, the post is able to rotate freely without effect on the flash unit even though the post is inserted into the camera flash cube receiving receptacle. With this arrangement the post serves as a means of supporting the flash unit on the camera and because the post is slidable, the flash unit is not restricted for use with cameras having a rotatable socket at not only one particular location. The Robinson patent also discloses a platform generally intended to secure the flash unit to the underside of the camera. The platform in combination with the post operates to secure the flash unit to both the top and bottom of the camera. Furthermore, the platform is movable in the vertical direction to permit the flash unit to be mounted on cameras of different thickness.

Also known in the art is a mechanism for mounting an electronic flash unit on a camera and which operates to disconnect a flash battery when the flash unit is not on the camera. For example, U.S. Pat. No. 3,177,353 issued to W. Schmidt on Apr. 6, 1965, shows a bracket for mounting an electronic flash unit on a camera, the bracket being movable between an extended position for mounting the flash unit and a recessed position. In its extended position the bracket can be inserted in an accessory shoe on the camera to couple the flash unit to the camera and to electrically connect the flash battery to the flash-firing electronics. In its recessed position, the bracket engages a control switch to electrically disconnect the flash battery from the flash electroncis.

SUMMARY OF THE INVENTION

One of the objects of the present invention is to provide an improved electronic flash unit which may be used with any camera of the type adapted to electrically fire flash devices.

A further object of the invention is to provide an improved electronic flash unit which may be used with any model of a particular line of cameras.

Another object of the invention is to provide an electronic flash unit of the aforementioned type, the flash unit having an improved adjustable mounting mechanism to permit the flash unit to be mounted on cameras which are of different size.

A further object of the invention is to provide. an adjustable mounting mechanism of the aforementioned type that prevents the flash battery from being electrically connected to the flashtube-firing electronics when the flash unit is not mounted on the camera.

A still further object of the invention is to provide an electronic flash unit of the type having cooperating contacts electrically connected to the flashtube-firing electronics and adapted to be connected to a camera flash-firing mechanism, the contacts being movable to permit the flashtube-firing electronics to be connected to the camera flash-firing mechanism independent of the location of the output terminals thereof.

Another object of the present invention is to provide an improved electronic flash unit having both a movable electrical plug and an adjustable mounting bracket to permit coupling of the flash unit to cameras which are of varying electrical design and size.

In accordance with the above objects, there is provided an electronic flash unit having flashtube-firing electronics for providing an electrical signal to energize a flashtube. The flash unit includes electrical contacts adapted to be connected to the output terminals of a camera flash-firing mechanism, a housing which includes a portion defining an operational path in which the flash unit contacts are located, and conductive means electrically connecting the flash contacts to the flashtube-firing electronics. The flash unit further includes means mounting the flash unit contacts for permitting movement of the flash contacts along the operational path to permit the contacts to be located at varying positions relative to the flash unit housing.

A further feature of the present invention is that the flash unit includes a mechanism for mounting the flash unit on a camera, the mounting mechanism being movable from a retracted position in which the mounting mechanism is ineffective to mount the flash unit on the camera over a range of operational positions in which the mechanism is located to mount the flash unit on a camera. An actuatable control switch responsive to the mounting mechanism connects the flash battery to the flashtube-firing electronics when the mounting mechanism is in any of its operational positions but is automatically disconnected from the flash battery when the mounting mechanism is in its retracted position. A latch member operatively associated with the mounting mechanism prevents the control switch from being closed while the mounting mechanism is in its retracted position.

The invention, and its objects and advantages, will become more apparent in the detailed description of the preferred embodiment.

BRIEF DESCRIPTION OF THE DRAWINGS

In the detailed description of a preferred embodiment of the invention presented hereinafter, reference is made to the accompanying drawings, in which:

FIG. 1 illustrates a perspective view of an electronic flash unit mounted on a camera with a lower portion of the flash unit removed to illustrate a flash-receiving receptacle or socket located in the top of the camera that is adapted to electrically connect the flash unit to a camera flash-firing mechanism located within the camera body;

FIG. 2 is a front elevation view of the flash unit illustrating an electrical plug, in either of two positions, configured to be inserted into the camera flash-receiving socket shown in FIG. 1, and a movable flash mounting bracket which is shown in an extended position;

FIG. 3 is an elevation view of the bottom of the flash unit showing the flash-mounting bracket, the flash plug and a track on which the plug is slidably mounted;

FIG. 4 is a prespective view of the bottom of the flash unit, partially in cross-section, with a portion of an interior wall of the flash unit removed to more clearly show the track on which the plug is mounted and the orientation of electrical wires connected to the plug in relation to the location of the plug on the track;

FIG. 5 is a cross-sectional view of the plug and the track taken along the lines 5—5 in FIG. 4;

DESCRIPTION OF A PREFERRED EMBODIMENT

Figure 6:
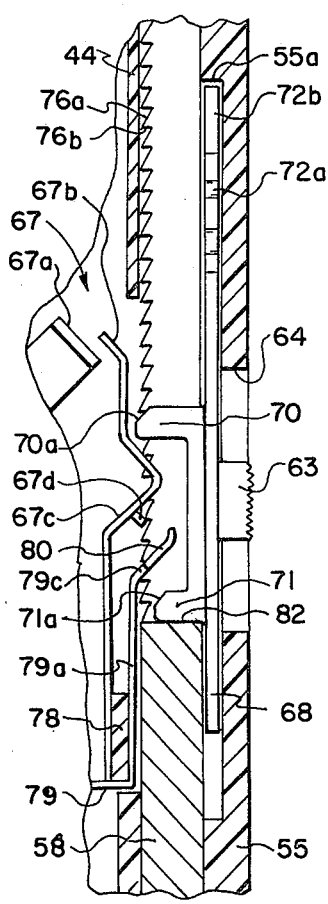
FIG. 6 is an elevation view of a portion of the front of the flash unit with the front wall thereof cut away to more clearly show a flash electrical control switch, a control buttom movably mounted on the side of the flash unit, a portion of the flash-mounting bracket, a latch mechanism operably associated with the mounting bracket and the control button, the button being shown in its OFF position.

Because electronic flash units are well known, the present description will be directed in particular to elements forming part of, or cooperating more directly with, apparatus in accordance with the present invention. It is to be understood that flash unit elements not specifically shown or described may take various forms well known to those having skill in the art.

There is shown in FIG. 1 of the drawings a camera 10 having an enclosed generally light-tight housing 12. Mounted within frontplate 14 thereof is a viewfinder 16 and a lens opening 18. A shutter release member 20, located within top wall 22, is operatively coupled to a shutter mechanism located within the camera housing in alignment with opening 18 to regulate the amount of light, reflected from a scene to be photographed, projected through the lens opening, the shutter being actuatable in response to a camera operator depressing the shutter release member.

Also located within top wall 22 is a flash-receiving receptacle or socket 24. Socket is described in detail in the aforementioned U.S. patent application Ser. No. 528,529 filed Nov. 29, 1974 in the name of Hargrave et al entitled CAMERA FLASH SOCKET, the disclosure of which is incorported herein by reference. Socket 24 may be described generally as including a front wall 26, a pair of spaced side walls 28, a rear wall 30, and a bottom wall 32, which together form a generally rectangular-shaped body surrounded by raised flange 34.

Front wall 26 includes an enlarged section 35 which extends above flange 34 and terminates in bottom wall 32. Mounted within section 35 are three spaced electrical contacts 36a, 36b, 36c which extend generally into the interior of socket 24. access openings in bottom wall 32 permit each of the electrical contacts to be connected to a flash-firing mechanism, not shown but located in the interior of camera 10, for triggering a flash device, such as electronic flash unit 40, ON. For that purpose, resilient fingers (not shown) extend generally upward through access openings (also not shown) in bottom wall 32, front wall 26, and rear wall 30 and terminate in an engaging projection to releasably retain the electronic flash unit which is described in further detail hereinafter.

Camera flash-firing mechanisms for triggering photographic flash devices are well known in the art and may take many forms. For example, the flash-firing mechanism may be of the type in which such a mechanism produces an electrical signal which is coupled directly to the terminals of a flash lamp. Arrangements of this type have been described in several patents, one of which is U.S. Pat. No. 2,972,937 issued to C. G. Suits on Feb. 28, 1961, entitled FLASH APPARATUS. A further arrangement of this type that represents an improvement over the flash-firing mechanism shown in the Suits patent is decribed in U.S. patent application Ser. No. 502,686 filed Sept. 3, 1974 in the name of F. S. Wollschleger. The Wollschleger application is entitled A TRIGGER DEVICE FOR AN ELECTRONIC FLASH UNIT and is assigned to the assignee of the present invention.

On the other hand, the flash-firing mechanism may be of the type that produces an electronical signal that is applied to an electronic switching element, rather than directly to a flash device. For example, the electrical signal may be utilized to activate a trigger circuit of an electronic flash unit. The trigger circuit may, for example include a trigger capacitor in series with the primary winding of a transformer, the transformer having a high voltage secondary winding connected to the flash trigger electrode. When the flash-firing mechanism of this type is activated, the electrical signal produced thereby operates to render the electronic switching element conductive. When this happens, the trigger capacitor discharges and due to the transformer a high voltage signal is applied to the trigger electrode to initiate firing of the flashtube. An arrangement of this type is disclosed in U.S. patent application Ser. No. 493,573 filed Aug. 1, 1974 in the name of E. S. Kendrick. The Kendrick patent application is entitles ELECTRONIC FLASH UNIT FOR CAMERAS ADAPTED TO RECEIVE FLASHBULBS and is also assigned to the assignee of the present invention.

Figure 8:
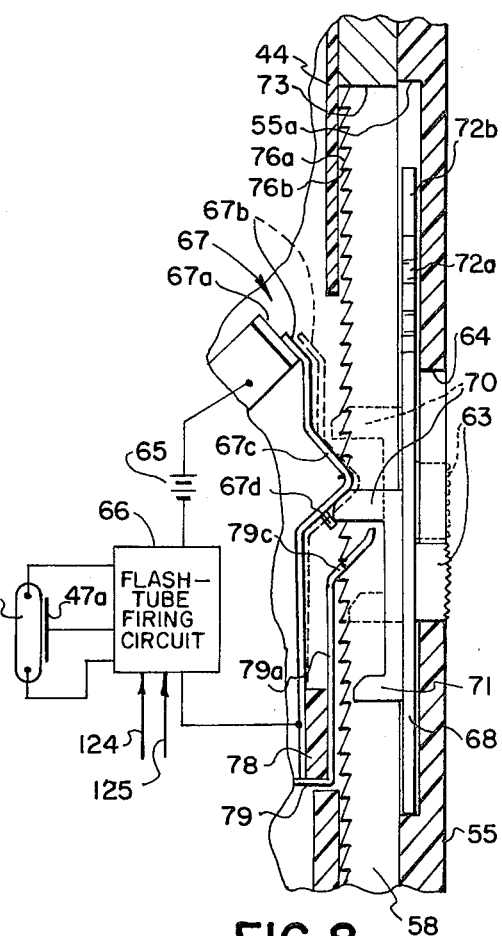
FIG. 8 is a view similar to the views shown in FIGS. 6 and 7 only showing in addition thereto in block form the flash unit electronics connected to the control switch and further showing the control button in its ON position wherein the control switch is closed to permit electrical power to be applied to the flash electronics.

Flash unit 40 includes a generally rectangular-shaped housing 41 comprising bottom wall 42, shown in FIG. 3, rear wall 43, shown in FIG. 5, sidewall 44 and front wall 45, which surrounds a flash window 46 through which light emitted from a flashtube 47, shown in FIG. 8, is directed. Housing 41 is formed of a pair of complimentary-shaped portions 41a, 41b which may be reasonably coupled together by suitable means such as screws (not shown) to permit an operator access to the inside of the flash unit.

Flash unit 40 may be operably coupled or attached to any model of a paricular type camera regardless of variations in model sizes and regardless of variations in the location of the camera flash-receiving receptacle on each camera model. To achieve this result, flash unit 40 includes a flash-mounting bracket 50 which is adjustable to mount the flash unit on cameras of different thickness and an electrical plug 100 which is movable to be positioned in alignment with camera flash-receiving receptacle 24 regardless of the location of the latter on top wall 22. It shall be understood that the teachings of the present invention are in no way limited to the specific configuration illurstrated for the flash-mounting bracket and, in particular, to the specific electrical plug disclosed in the preferred embodiment. Rather, the particular bracket and plug described and illustrated in the drawings may take various forms, the specific configurations to be described having been selected merely to permit operational coupling of the flash unit to the particular type camera selected to be illustrated in the drawings.

FLASH-MOUNTING BRACKET

Integrally connected to sidewall 44 is a rectangular-shaped projection 52 which in combination with sidewall 44 forms a receiving chamber or pocket for receiving flash-mounting bracket 50. Projection 52 is formed of a top wall 53, a pair of spaced sidewalls 54, a front wall 55 and a bottom wall 56 from which is formed a generally rectangular-shaped opening 57 shown perhaps most clearly in FIG. 3. Bracket 50 is generally L-shaped and comprises an elongate member 58 and a forked member 59 extending beneath flash bottom wall 42 perpendicular to member 58 and which forms a platform or plate upon which camera 10 can be supported. Member 59 is forked to provide a suitably wide base to support camera 10 yet to permit plug 100 to be positioned close to sidewall 44 in the event the camera flash-receiving receptacle is located toward the extreme right side, as viewed in FIG. 1, of the camera body. Mounted on the top of each finger 60 is a resilient pad 61 which permits member 59 to be fitted snugly underneath camera 10 without marring or scratching the same. Pad 61 may, furthermore, be ribbed or knurled so as to permit a firmer grip to be formed between flash unit 40 and camera 10.

Bracket 50 is movable in the vertical direction as viewed in FIG. 2 over a range of positions between a recessed position, shown by dashed lines, in which pads 61 abuttingly engage bottom wall 42 and an extended position, shown by the solid lines in which platform 60 is displaced from the flash bottom wall. Bracket 50 can be adjusted to intermediate positions to mount flash unit 40 on cameras of different thicknesses. Such adjustment of bracket 50 can be brought about by means of a knurled control button 63 which is operably associated with member 58 and which is mounted for slidable movement within a rectangular opening 64 formed from the central portion of front wall 55. Button 63, which is accessible to an operator is movable between (1) a top, release position, shown most clearly in FIG. 7, in which mounting bracket 50 is released for slidable movement in and out of projection 52, (2) an intermediate, OFF position, shown most clearly in FIG. 6, in which a flash unit battery 65 is electrically disconnected from a flashtube-firing ciruit 66, the battery and firing circuit being shown in schematic form in FIG. 8, and (3) a bottom, ON position, also shown in FIG. 8, in which the flash battery is electrically connected through a control switch 67 to the firing circuit to ready flash unit 40 for a flash-firing operation.

Figure 9:
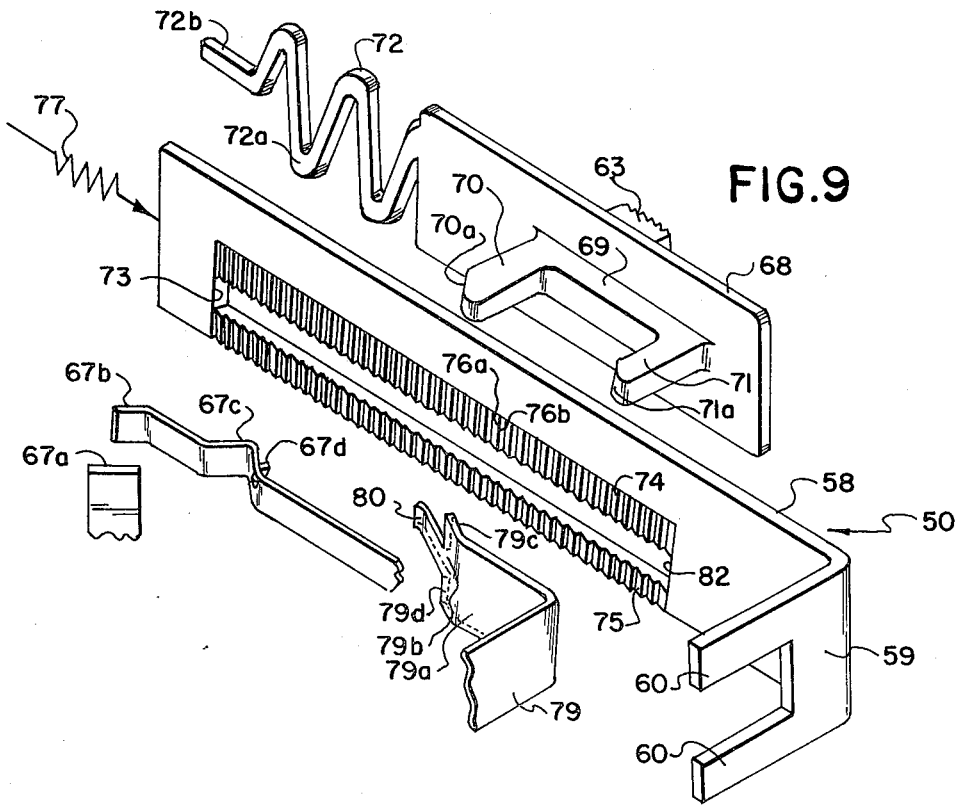
FIG. 9 is an exploded perspective view showing the control button and a portion of the associated control switch, the flash-mounting bracket and the latch mechanism.

To more easily understand the interrelationship between flash-mounting bracket 50, control button 63 and control switch 67 reference is made to FIG. 9. Button 63 is integrally connected to one side of a flat, plate-like member 68 which is interposed between front wall 55 and member 58 for slidable movement therebetween. Integrally connected to the opposite side of member 68, adjacent member 58, is a control member 69 having a pair of spaced finger members 70, 71, the ends of which define cam surfaces 70a, 71a, respectively, Integrally connected to the top end of plate 68 is a control member 72 which forms a wave-like or sinusoidal-like portion 72a and which terminates in a finger portion 72b. Member 72 is made of a resilient material which by virtue of portion 72a can be compressed in its axial or longitudinal direction. When button 63 is in its OFF position, the end of finger 72b is located adjacent or close to abutment 55a and member 72 is not compressed. However, when button 63 is moved toward its release position, finger 72b abuttingly engages abutment 55a and portion 72a is progressively compressed as the button approaches its release position. As this happens, a bias force acts against member 68, such that when operator finger pressure is removed from button 63, the button is automatically returned from its release position to its OFF position under the influence of this bias force.

Formed from the interior portion of member 58 is an elongate, rectangular-shaped opening 73. Opening 73 is adapted to receive finger members 70, 71 which project therethrough as shown in FIGS. 6 and 8. Formed from the interior side of member 58 immediately adjacent each of the elongate sides of opening 73 is a set of contiguous indentations, notches or teeth 74, 75 each set extending the length of opening 73. As viewed in FIGS. 6–8, teeth 74, 75 are defined in the downward direction by gradually inclined ramp-like surfaces 76a and a surface 76b which is perpendicular to the longitudinal axis of member 58. Bracket 50 is biased in the downward direction, as viewed in FIGS. 6–8, by a spring 77 shown diagrammatically in FIG. 9, spring 77 being located between top wall 53 and the top of member 58 in a cavity therebetween.

Control switch 67 is comprised of stationary contact 67a located towards the interior of flash unit 40 and an elongate contact 67b which is fixedly secured at one end to a stationary support member 78 so as to extend generally upright in a direction similar to that of member 58. Switch contact 67b is configured such that a control portion thereof forms a V-shaped projection 67c which is oriented such that the vertex thereof extends into opening 73. Projections 67c is located within opening 73 so as to be engaged by cam surface 70a when button 63 is in its ON position shown in FIG. 8. Projection 67d serves to releasably retain finger 70 in this engaging position when button 63 is in its ON position. When such an engagement occurs, contact 67b is pivoted in the counterclockwise direction to engage contact 67a, as viewed in FIG. 8, to close switch 67 so as to connect battery 65 to flash-firing circuit 66.

Figure 7:
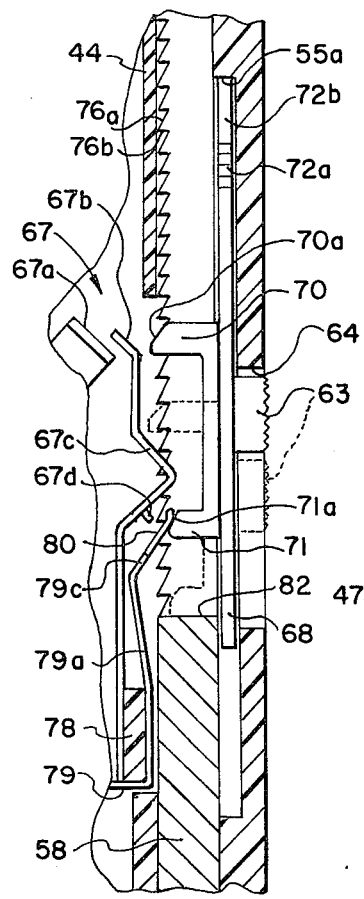
FIG. 7 is a view similar to the view shown in FIG. 6 only showing the control button in its release position wherein the latch mechanism is caused to be disconnected from the flash-mounting bracket.

There is also shown in FIG. 9 a generally L-shaped latch 79 which is fixedly mounted about support member 78 as shown in FIGS. 6–8. Member 79a extends generally parallel to member 58. However, the top portion 79b, which terminates in finger 80, is inclined towards member 58 so that finger 80 extends into opening 73 and corners 79c, 79d engage, respectively, a one of the teeth 74, 75. In this manner, latch 79 in combination with member 58 and in particular each set of teeth 74, 75, operates as a ratchet mechanism. That is, so long as corners 79c, 79d engage teeth 74, 75, bracket 50 is prevented from moving in the downward direction but by virtue of the angle of the teeth the bracket is permitted to move in the opposite, upward direction even when latch 79 engages the teeth on member 58.

In view of this ratchet effect, for bracket 50 to be moved in the downward direction towards its extended position, button 63 must be moved from its OFF position to its release position. In its release position, cam surface 71a engages finger 80 and thereby pivots member 79a in the counterclockwise direction whereby corners 79c, 79d thereof are disengaged from teeth 74, 75, respectively. Spring 77, being a strong spring, then operates to quickly drive bracket 50 to its extended position shown in FIG. 2. Once operator finger pressure is removed from button 63, resilient member 72 returns the bottom automatically to its normal OFF position.

When bracket 50 is no longer in its extreme, recessed position, platform 59 may be moved closer to the bottom of flash unit 40 to adjust the space therebetween to the particular size camera on which the flash is to be mounted. It shall be understood from the foregoing description that this adjustment can occur since corners 79c, 79d merely ride over successive teeth surfaces 76a and do not operate to prevent such upward movement of bracket 50.

A further feature of the invention is that when bracket 50 is in its recessed position, battery 65 is automatically prevented from being connected to flash-firing circuit 66. This is important since if battery 65 can not be connected to flash-firing circuit 66, the battery can not be inadvertantly drained of its power. As to how this result is achieved is shown most clearly in FIG. 6 in which bracket 50 is in its recessed position and button 63 is in its normal OFF position under the influence of member 72. When these conditions exist, leg 70 is disengaged from switch contact portion 67c whereby the switch 67 is open and battery 65 is disconnected from circuit 66. Furthermore, under these conditions leg 71 abuttingly engages surface 82 which defines the bottom of opening 73. Due to the ratchet effect of latch 79 and teeth 74, 75, bracket 50 is secured against movement from its recessed position. As a result, button 63 is prevented from being moved from its OFF position directly to its ON position when bracket 50 is in its recessed position and switch 67 is maintained in an open position.

FLASH UNIT PLUG

Referring now to FIGS. 2 through 5 there is shown flash unit plug 100 which is mounted for slidable movement along a track 102 across bottom wall 42 of flash unit 40 between side 44 and the opposite side of the flash unit. Plug 100 includes a generally rectangular-shaped base 104 having front and rear sufaces 106, 108, respectively. A pair of spaced cam surfaces and retaining surfaces 110, 112, respectively, are formed in front surface 106. Base 104 further includes electrical contact strips 113, 114 located on front surface 106 as shown in FIG. 2. These strips are spaced so as to engage, respectively, contacts 36a, 36b when plug 100 is inserted into socket 24. For the purpose of electrically connecting flash unit 40 to socket 24, only two of the three contacts 36a, 36b, 36c are utilized. The reason for the third contact as well as a further more detailed description of the base portion of plug 100 and socket 24 can be found in the aforementioned Hargrave et al patent application. It suffices to say that the third contact is of no particular significance to the present invention and that by virtue of base 104 and front and rear surfaces 106, 108, plug 100 is configured such that when inserted into socket 24 an electrical signal produced by the camera flash-firing mechanism is appropriately applied to contacts 113, 114.

Base 104 is integrally connected to a rectangular-shaped intermediate support member 115. Member 115 is located within a rectangular opening 116 formed from bottom wall 42 of flash unit 40. It is preferred that the width of member 115 be only slightly less than the width of opening 116 to permit free movement of such member therealong yet to gaurd against dirt, sand or other contaminants becoming wedged between member 115 and the opening so as not to impede such movement.

As is shown most clearly in FIG. 5 member 115 is integrally connected to a generally U-shaped member 117 defined by spaced, parrallel legs 117a, 117b which are coupled together through base portion 117c. Legs 117a, 117b are spaced to receive therebetween an interior flash unit partition or wall 120 which extends generally from side 44 of flash 40 to the other side thereof parallel to wall 42. The top 120a of the wall faces front wall 45 and as is most clearly shown in FIG. 5 is spaced from the front wall by distance which permits base 117c to be loosely received in such a space. By virtue of the arrangememt between member 117 and wall 120 and the aforementioned location of intermediate member 115, the entire plug assembly, as is most clearly shown in FIG. 4, can be slidably moved from one end of track 102 to the other end thereof guided by wall 120.

Continuing to refer to FIG. 4, it can be seen therein that the aforementioned contact strips 113, 114 are affixed to U-shaped member 117 and terminate on the outer side of leg 117b thereof. Contact strips 113, 114 are warpped around member 117 as shown in FIG. 4 and follow the surface of intermediate member 115 through opening 116 wherein each of such strips terminate on front surface 106 as shown in FIG. 2.

Electrical wires 124, 125 are connected respectively to contact strips 113, 114 and are connected at the opposite end thereof to flash-firing circuit 66, as shown in FIG. 8 so as to be electrically coupled to flash trigger electrode 47a.

It can be appreciated that as plug 100 is moved along track 102 a certain amount of movement of wires 124, 125 occurs. Furthermore, a certain amount of slack or excess wire length will occur for those positions of plug 100 along the track that are closest to the input connection to flash circuit 66. It is preferred to isolate as much of the wires from the extreme interior of flash unit 40 as possible to gaurd against snagging or catching of wires 124, 125 as they move with or follow plug 100. To achieve this result, a wall 126 is spaced from wall 120 toward the interior of the flash unit and extends from back wall 43 to front wall 45. By virtue of wall 126 and the combination of plug assembly portion 117 and wall 120 a substantially enclosed elongate chamber 130 is formed between each of such walls and the flash unit side walls,. Chamber 130 serves to collect and to thereby confine any excess wire, by virtue of the location of plug 100, to a limited space within the interior of flash unit 40. Due to the inherent stiffness of wires 124, 125, each wire is caused to fold back on itself as plug 100 is moved so as to form a pair of open ended loops within chamber 130, the size of these loops being determined by the location of the plug along wall 120. This effect is most clearly illustrated in FIG. 4. Wires 124, 125 may then be passed through spaced openings in wall 126 to be connected to flash circuit 66. That portion of the wires between wall 126 and circuit 66 remains stationary and wire entanglement within the flash interior is prevented.

The invention has been described in detail with particular reference to a preferred embodiment thereof, but it will be understood that variations and modifications can be effected within the spirit and scope of the invention. In accordance with that preferred embodiment, there has been described an electronic flash unit having an adjustable flash attachment bracket and a movable electrical plug that accomplishes the aforementioned objectives.

I claim:

1. In an electronic flash unit having a housing, a flashtube mounted within said housing, and electrical means for energizing said flashtube, the improvement comprising:
   a. electrical contacts adapted to be electrically connected to the output terminals of a flash-firing mechanism;
   b. means associated with said housing for defining an operational path;
   c. means electrically connecting said electrical contacts to said electrical means; and
   d. means mounting said electrical contacts for moving said contacts along said path while said contacts remain electrically connected to said electrical means to position said contacts over a continuous range of flash-firing locations relative to said flashtube.

2. In an electronic flash unit having a housing, a flashtube mounted within said housing, and electrical means for energizing said flashtube, the improvement comprising:
   a. means for defining electrical contacts adapted to be operatively coupled to a flash-firing mechanism;
   b. means associated with said housing for defining an operational path;
   c. means electrically connecting said electrical contacts to said electrical means; and
   d. a support member, mounting said electrical contacts, mounted for movement along said operational path to effect relative movement between said contacts and said flashtube to position said contacts over a range of flash-firing positions relative to said flashtube;
   e. said electrically connecting means being adapted for maintaining said contacts electrically connected to said electrical means while said support member is moved along said operational path.

3. In an electronic flash unit having means for receiving a source of electrical energy, a flashtube, and an energizable electrical control circuit for flashing and flashtube, the improvement comprising:
   a. a flash mounting mechanism for detachably coupling said flash unit to a photographic camera, said mounting mechanism being mounted for movement between (1) an extended position in which said mounting mechanism is located to permit said flash unit to be mounted on the camera, and (2) a retracted position in which said mounting mechanism is ineffective to mount said flash unit on the camera;
   b. an actuatable control switch having (1) a normal open position in which a received source of electrical potential is disconnected from said control circuit, and (2) a closed position in which the received electrical potential source is connected to said control circuit;

c. a ratchet mechanism for preventing said control switch from being closed while said mounting mechanism is in its retracted position; and d. a manually actuatable control member operatively associated with said control switch and said ratchet mechanism and having (1) a first position in which said control switch is urged into its closed position, (2) a second position wherein said control switch automatically assumes its normal open position, and (3) a third position wherein said ratchet mechanism is effectively disabled to permit said mounting mechanism to assume its extended position.

4. In an electronic flash unit having a flashtube, a housing in which said flashtube is located, trigger circuit means for triggering said flashtube ON, and first and second electrical contacts electrically connected to said trigger circuit means and adapted to be electrically connected to the output terminals of flash-firing mechanism, the improvement comprising:

a. means associated with said housing for defining an operational path having first and second terminal positions between which said first and second contacts are located; and b. means for moving said first and second contacts relative to said flashtube over a continuous range of positions between said first and second terminal positions while maintaining said first and second contacts continuously connected to said trigger circuit means.

5. In an improved electronic flash unit having a flashtube and electrical means for energizing said flashtube, said electronic flash unit further including a plug having cooperating contacts electrically connected to said electrical means, the improvement comprising:

a. a housing in which said flashtube is located, said housing defining a passage in which said plug is located; and b. guide means for slidably moving said plug along said passage to enable said cooperating contacts to be positioned over a continuous range of flash-firing positions relative to said flashtube without disconnecting said cooperating contacts from said electrical means.

* * * * *

PO-1050
(5/69)

UNITED STATES PATENT OFFICE
CERTIFICATE OF CORRECTION

Patent No. 3,997,775            Dated December 14, 1976

Inventor(s) Jeffrey Richard Stoneham

It is certified that error appears in the above-identified patent and that said Letters Patent are hereby corrected as shown below:

| | |
|---|---|
| Column 2, line 64 | Please delete "." |
| Column 4, line 66 | Please delete "access" and substitute therefor --Access-- |
| Column 5, line 22 | Please delete "S." and substitute therefor --D.-- |
| Column 5, line 27 | Please delete "electronical" and substitute therefor --electrical-- |
| Column 5, line 44 | Please delete "entitles" and substitute therefor --entitled-- |
| Column 5, line 54 | Please delete "reasonably" and substitute therefor --releasably-- |
| Column 5, line 65 | Please delete "thickness" and substitute therefor --thicknesses-- |
| Column 7, line 3 | Please delete "," and substitute therefor --.-- |
| Column 7, line 23 | Please delete "6 and 8" and substitute therefor --6 through 8-- |

O-1050
(5/69)

UNITED STATES PATENT OFFICE
CERTIFICATE OF CORRECTION

Patent No. 3,997,775    Dated December 14, 1976

Inventor(s) Jeffrey Richard Stoneham

It is certified that error appears in the above-identified patent and that said Letters Patent are hereby corrected as shown below:

Column 9, line 9     Please delete "gaurd" and substitute therefor --guard--

Column 9, line 58    Please delete ","

Column 10, line 52   Please delete "and" and substitute therefor --said--

Signed and Sealed this

First Day of March 1977

[SEAL]

Attest:

RUTH C. MASON
Attesting Officer

C. MARSHALL DANN
Commissioner of Patents and Trademarks